United States Patent
Banno (10) Patent No.: US 6,594,362 B2
(45) Date of Patent: Jul. 15, 2003

(54) RADIO DATA TRANSMISSION APPARATUS

(75) Inventor: Satoshi Banno, Tokyo (JP)

(73) Assignee: NEC Corporation, Tokyo (JP)

( * ) Notice: Subject to any disclaimer, the term of this patent is extended or adjusted under 35 U.S.C. 154(b) by 50 days.

(21) Appl. No.: 09/087,300

(22) Filed: May 29, 1998

(65) Prior Publication Data

US 2001/0016043 A1 Aug. 23, 2001

(30) Foreign Application Priority Data

May 30, 1997  (JP) .............................................. 9-142179

(51) Int. Cl.$^7$ .............................. H04L 9/00; H04K 1/00
(52) U.S. Cl. ...................................... 380/262; 380/274
(58) Field of Search ................................. 380/262, 274

(56) References Cited

U.S. PATENT DOCUMENTS

| | | | | |
|---|---|---|---|---|
| 4,179,657 A | * | 12/1979 | Hobbs ........................... | 325/33 |
| 5,199,072 A | | 3/1993 | White et al. | |
| 5,237,614 A | * | 8/1993 | Weiss .......................... | 713/159 |
| 5,369,706 A | * | 11/1994 | Latka .......................... | 380/23 |
| 5,491,752 A | * | 2/1996 | Kaufman et al. ............. | 380/30 |
| 5,608,778 A | * | 3/1997 | Partridge, III ............... | 379/58 |
| 5,787,169 A | * | 7/1998 | Eldridge et al. ............... | 380/4 |
| 5,862,223 A | * | 1/1999 | Walker et al. ................ | 380/25 |
| 5,881,152 A | * | 3/1999 | Moos ........................... | 380/4 |
| 5,884,274 A | * | 3/1999 | Walker et al. ................. | 705/4 |
| 5,982,896 A | * | 11/1999 | Cordery et al. ............... | 380/21 |
| 6,002,769 A | * | 12/1999 | McGough .................... | 380/28 |
| 6,038,320 A | * | 3/2000 | Miller .......................... | 380/44 |
| 6,081,893 A | * | 6/2000 | Grawrock et al. .......... | 713/183 |

OTHER PUBLICATIONS

Schneier, Bruce, Applied Cryptography, 1996, pp. 455–459.*

Schneier, Bruce, Applied Cryptography, 1996, p. 31.*

* cited by examiner

Primary Examiner—Gilberto Barrón
Assistant Examiner—Douglas Meshlan
(74) Attorney, Agent, or Firm—Scully, Scott, Murphy & Presser

(57) ABSTRACT

A ciphered message contained in a radio signal is displayed as it is if a code number contained in a received radio signal does not coincide with a preliminarily registered code number. On the other hand, if the code number contained in the radio signal coincide with the preliminarily registered code number, the message is deciphered and displayed on a display portion when a code number input from an input portion coincides with a received code number.

9 Claims, 10 Drawing Sheets

Fig.1

Prior Art

Fig.2

FREE PAGER NUMBER

| PROGRAM NUMBER | IDENTIFICATION CODE | DESTINATION NUMBER | CODE NUMBER | CONTENT OF MESSAGE |
|---|---|---|---|---|
| 250 | [ | 119110 | 9999 | 495156 |

MESSAGE INFORMATION

Prior Art

CODE NUMBER  NAME

Fig.10

RADIO DATA TRANSMISSION APPARATUS

BACKGROUND OF THE INVENTION

1. Field of the Invention

This invention relates to a radio data transmission apparatus, and more particularly to a radio data transmission apparatus for receiving a message having a code number.

2. Description of the Related Art

A message information receiving apparatus for receiving various kinds of message information using a mobile FM teletext broadcasting has been disclosed in, for example, Japanese Unexamined Patent Application No. Hei 8-149028.

Figure 1:
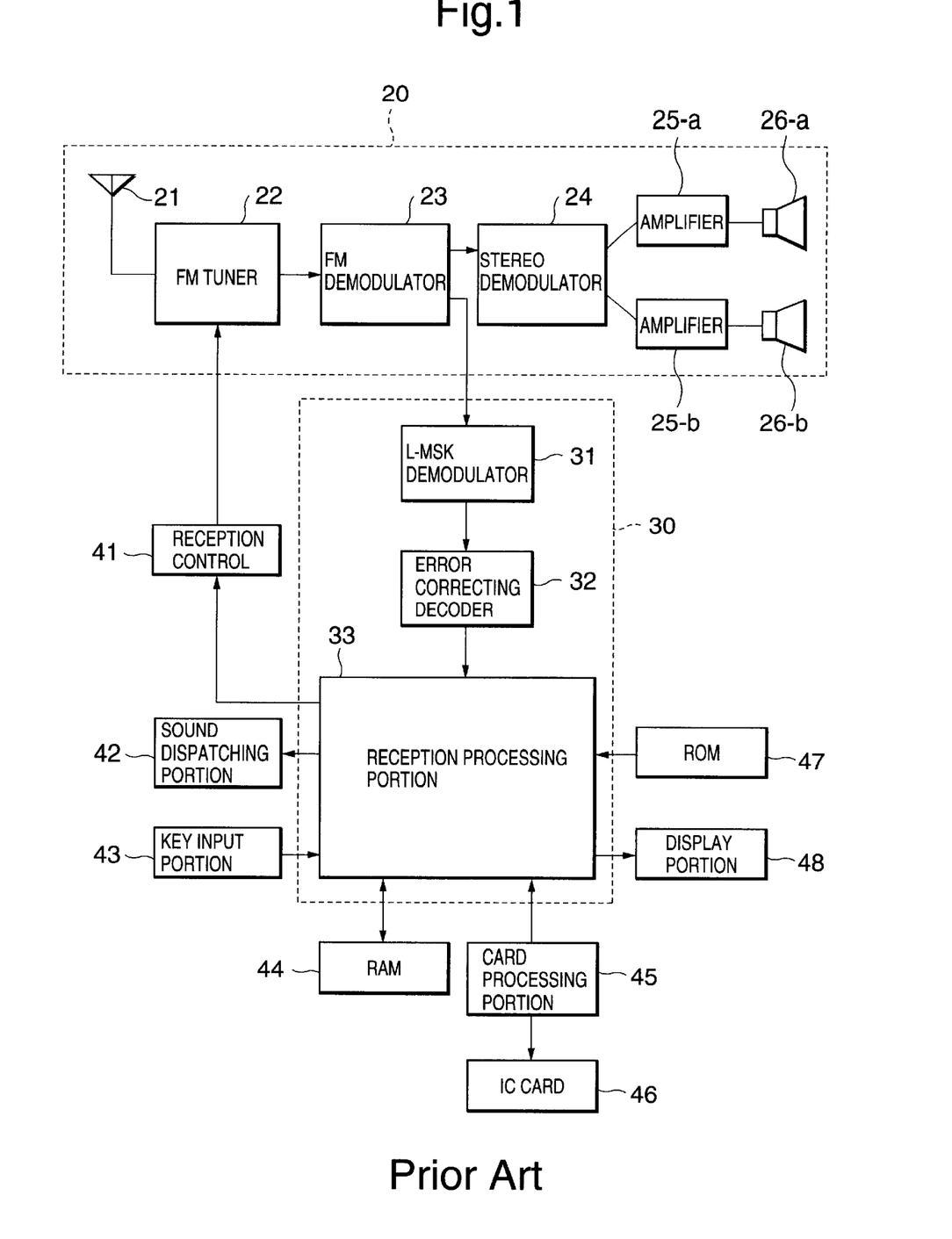
FIG. 1 is a block diagram of a message information receiving apparatus of an example of conventional art.

FIG. 1 is a block diagram showing an example of such conventional art. Referring to FIG. 1, the receiving apparatus comprises a FM radio section 20 for receiving FM broadcasting radio wave and making voices and a message information reception processing section 30 for carrying out various processings for the message information multiplexed in FM broadcasting radio wave received by the FM radio section 20.

The FM radio section 20 comprises an antenna 21 for receiving FM broadcasting radio wave, a FM tuner 22 for tuning the FM radio broadcasting, a FM demodulator 23 for demodulating FM signal, a stereo demodulator 24 for converting the demodulated FM signal to stereo signal, a pair of amplifiers 25a, 25b for amplifying an output signal of the stereo demodulator and a pair of speakers 26a, 26b for outputting the signal amplified by the amplifiers in the form of voice.

The message information reception processing section 30 is connected to the aforementioned FM demodulator 23 and comprises a L-MSK (level controlled minimum shift keying) demodulator 31 for separating the message information multiplexed in the FM broadcasting radio wave, an error correcting decoder 32 and a reception processing portion 33 for performing various kinds of processings for the separated message information.

To this reception processing portion 33 are connected a ROM 47 storing a processing program, a key input portion 43 which is an input means for a destination number, a code number and message information, a display unit 48 which is a display means for displaying the message information and the like, a card processing portion 45 for performing read/write for an IC card 46, a RAM 44 for storing the received message information, input data from the key input portion 43 and the like, a sound dispatching portion 42 for dispatching a sound corresponding to a result of processing by the reception processing portion 33, and a reception control portion 41 for tuning reception of the FM tuner 22.

Figure 2:
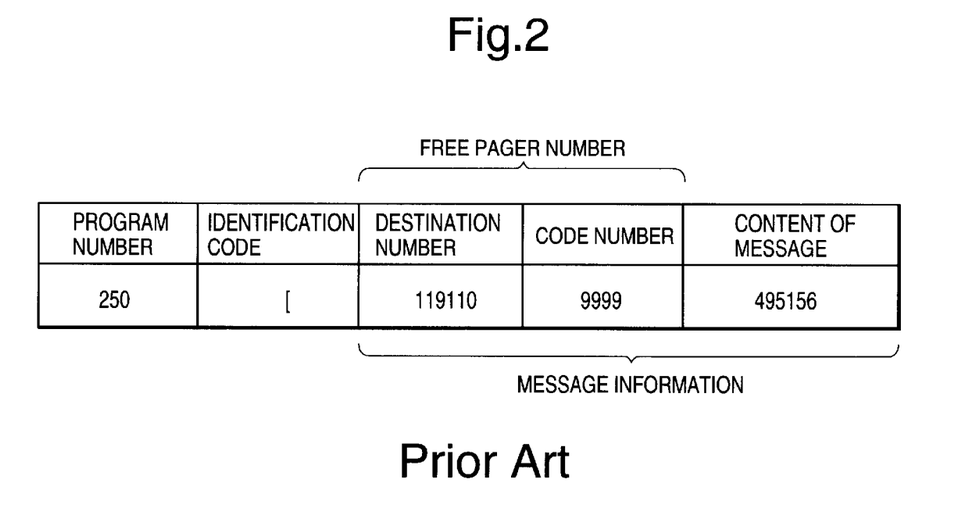
FIG. 2 is an example of transmission signal format for message information according to the conventional art.

FIG. 2 is an example of a transmission signal format of the message information for FM-multiplexing a pager program.

A program number "250" indicates that this message information is a pager program and an identification code "[" indicates a type (a number inherent of an apparatus or a number determined freely) of the pager number. The message information includes "destination number", "code number" and "message content".

Next, operations will be described.

If the message information receiving apparatus receives FM multiplexed broadcasting, the L-MSK demodulator 31 separates the transmission signal. In the FM multiplexed transmission signal, the pager number (destination number+ code number) are compared with the destination number and code number stored in the RAM 44, and only when it coincides therewith, the sound dispatching portion 42 dispatches the sound and the message content is displayed on the display portion 48.

However, as for the conventional message receiver capable of displaying characters like a pager and the like, when a transmission side transmits a character message thereto, other people than a person of a destination of the message may see it. Because of telephone number input error upon transmission of a message, use of a receiver by other people without permission and the like, a message may be seen by other people whom a transmitter does not imagine.

Further, in a case when a single message receiver is shared with persons, a message can be read by anybody because a destination of the received message cannot be distinguished, so that confidential treatment for allowing only a particular person to read cannot be carried out.

Further, because a received code number coincides with a stored code number, the received message is displayed, and therefore despite provision of the code number, other people than the particular person can read the message.

SUMMARY OF THE INVENTION

Accordingly, an object of the invention is to provide a radio data transmission apparatus capable of protecting privacy of a message transmitter provided that an improper message is sent, a receiver is used without permission of an owner or a receiver is shared among plural persons.

In the radio data transmission apparatus of the present invention, the message is scrambled when it is transmitted. The message is provided with a code number which is a key for releasing the scramble. The message and code number are both scrambled and sent to outside.

A receiving person is notified of the code number contained in transmission data by a transmitting person. If data is received, the receiving person inputs the notified code number so that a scrambled code of the code number is compared with the code number contained in the transmission data. Then, whether or not the scramble should be released is determined. If both the code numbers coincide with each other, the scramble of the data is released and the message is displayed. If they do not coincide, the data is displayed as it is.

Preferably, this radio data transmission apparatus comprises an input portion for inputting a message and code number, a scramble generating portion for scrambling entire transmission data containing the code number at the time of transmission and further scrambling a code number input for unscrambling at the time of reception, a comparing portion for comparing a code obtained by scrambling a code number input by the receiving person from the input portion at the scramble generation portion, a unscrambling portion for unscrambling the reception data when they coincides with each other as a result of the comparison and a display portion for displaying a message.

In the radio data transmission apparatus of the present invention, by providing transmission data with a code number for unscrambling the transmission data as well as the message, only a person permitted by the transmitting person (person knowing a code number attached to the message) can make the code numbers coincide with each other at the comparing step and then unscramble and display the data.

Further, because the code number aims at unscrambling the transmission data, even if data is displayed as it is although the code numbers do not coincide at the comparing step, the displayed data cannot be read because the scramble has not been released. Thus, there is no problem in viewpoints of security. Conventional data having only message information is not scrambled because no code number is contained, and that data can be displayed promptly, so that the scrambled data and conventional data can be handled in the same manner without any distinction.

BRIEF DESCRIPTION OF THE DRAWINGS

These and other objects, features and advantages of this invention will become more fully apparent from the following detailed description taken with the accompanying drawings in which.

In the drawings, the same reference numerals denote the same structural elements.

DESCRIPTION OF THE PREFERRED EMBODIMENTS

Hereinafter, a preferred embodiment of the present invention will be described with reference to the accompanying drawings.

Figure 3:
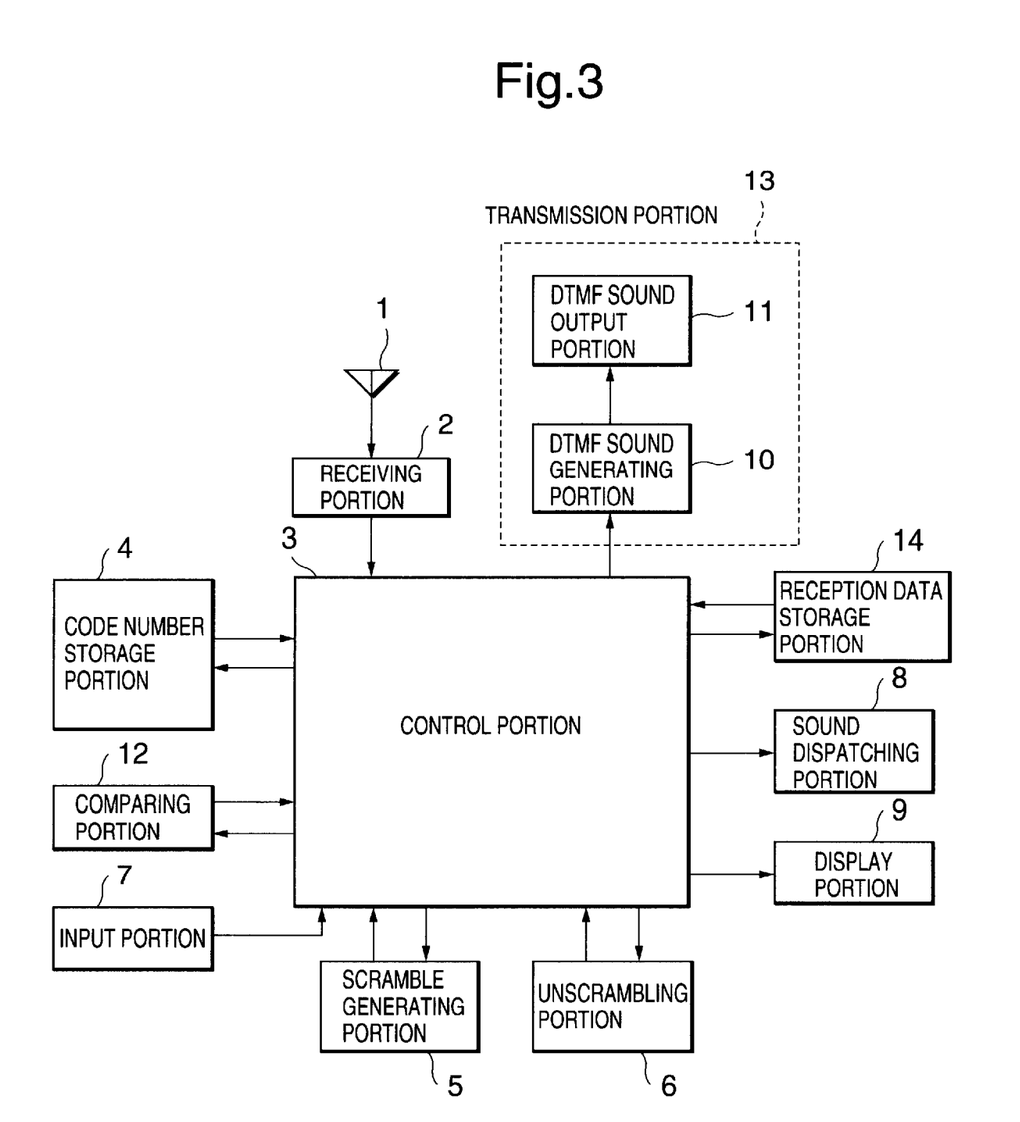
FIG. 3 is a block diagram showing a preferred embodiment of the present invention.

FIG. 3 is a block diagram showing a radio data transmission apparatus according to a preferred embodiment of the present invention.

A receiving antenna 1 receives a transmission message which is modulated and transmitted by other party. A receiving portion 2 demodulates a received message. A control portion 3 controls an operation of this radio data transmission apparatus. A comparing portion 12 compares and verifies a code number which is a specific sign contained in the received signal. A reception data storage portion 14 stores a received message. A code number storage portion 4 registers and stores a code number for releasing scramble. A scramble generating portion 5 applies scramble to the transmission message and registered code number. A unscrambling portion 6 unscrambles the transmission message. An input portion 7 inputs a message, code number and the like and a message transmission instruction. A notification portion 8 notifies of an arrival of the message by sound, light or vibration. A display portion 9 displays the message on liquid crystal display (LCD). A transmission portion 13 transmits the message to outside. Preferably, the transmission portion 13 contains a DTMF sound generating portion 10 for converting a transmission message corresponding to DTMF sound and a DTMF sound output portion 11 for outputting DTMF sound.

Next, an operation of the embodiment of the present invention will be described with reference to FIGS. 3–7.

Figure 4:
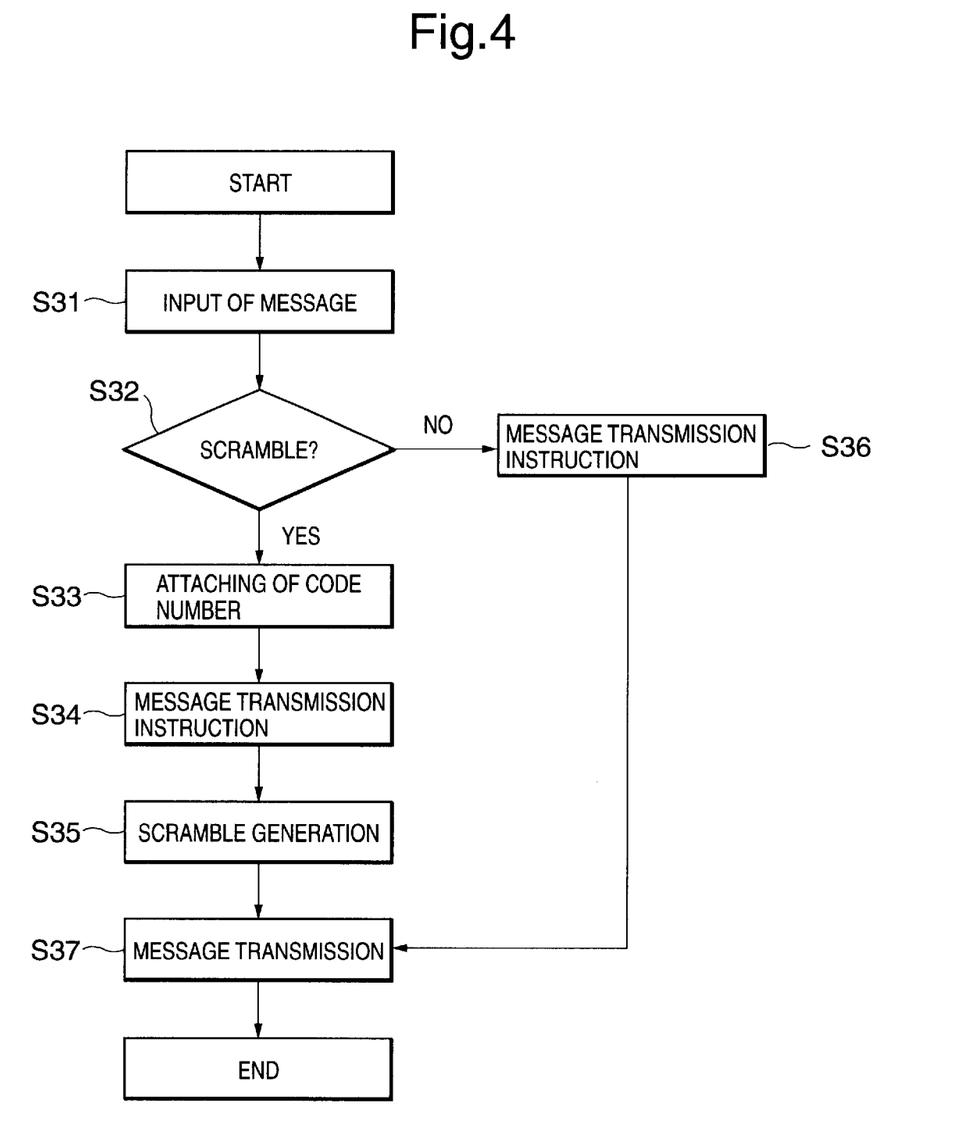
FIG. 4 is a flow chart for explaining a message transmission action of a preferred embodiment of the radio data transmission apparatus shown in FIG. 3.
Figure 5:
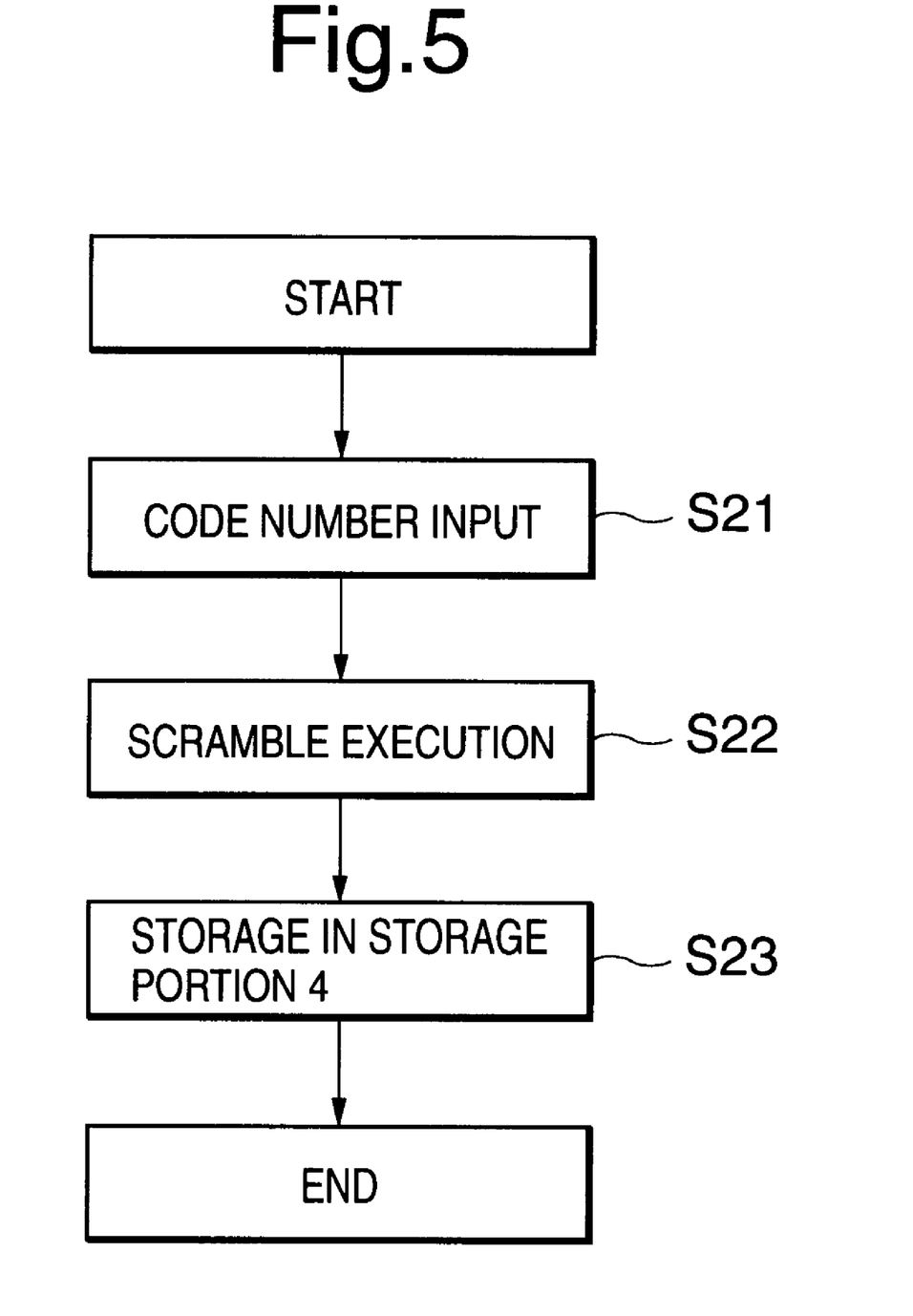
FIG. 5 is a flow chart for explaining a preferred embodiment of a code number registration action of the embodiment shown in FIG. 3.
Figure 6:
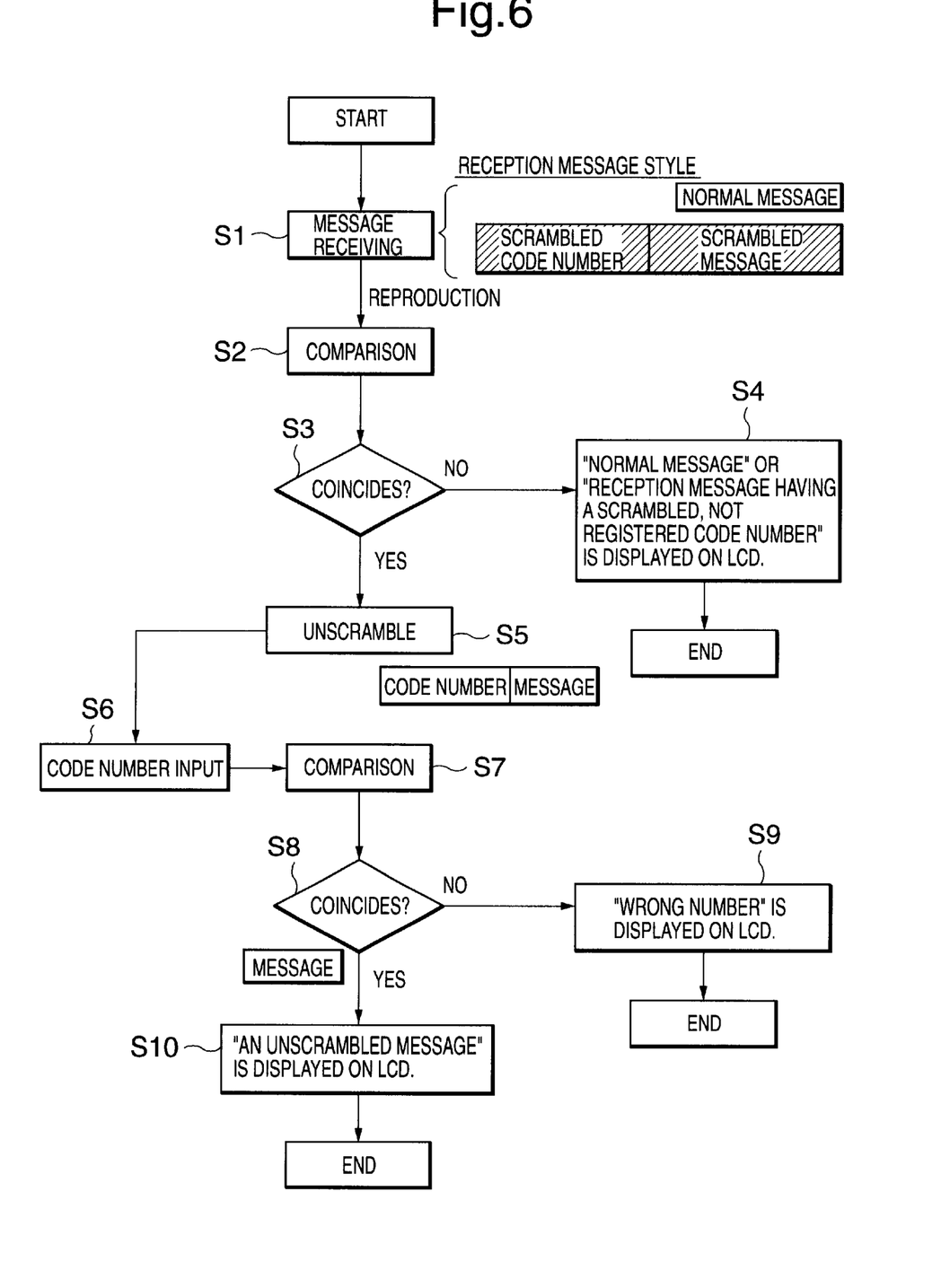
FIG. 6 is a flow chart for explaining a message reception/reproduction action of a preferred embodiment of the radio data transmission apparatus shown in FIG. 3.
Figure 7:
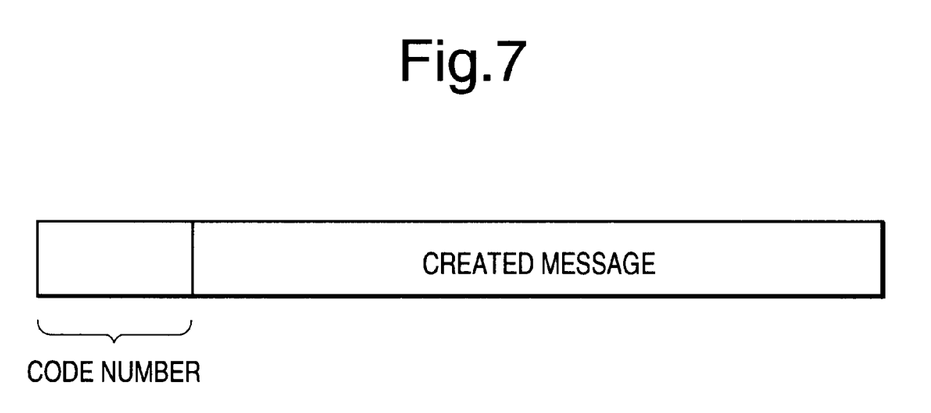
FIG. 7 is a message structure diagram of a message having a code number.

FIG. 4 is a flow chart for explaining message transmission action of the radio data transmission apparatus of the present invention. FIG. 5 is a flow chart for explaining message receiving/reproduction action of the radio data transmission apparatus of the present invention. FIG. 6 shows a message structure of a message provided with a code number.

A case in which scramble message transmission and reception are carried out using the radio data transmission apparatus of the present invention between a message transmitting person and a message receiving person will be described below.

At the time of message transmission, the message transmitting person produces a transmission message. Then, a message is input through the input portion 7 of the radio data transmission apparatus (S31). If the message is not scrambled (S32, No), a message transmission instruction is input through the input portion 7 (S36) and then the message is transmitted (S37).

On the other hand, if the message is scrambled (S32, Yes), a specified number of characters, preferably four numeral characters are input through the input portion 7 to provide the message with a code number which is a specific sign (S33). The code number is used by the message receiving person to unscramble the message. The input code number is attached to a head of the message (see FIG. 7). The message production is terminated here.

If a scramble message transmission instruction is input through the input portion 7 (S34), the message with the code number produced just before is controlled by the control portion 3 and input to the scramble generating portion 5. In the scramble generating portion 5, the code number and message are scrambled (S35) and transmitted to outside (S37).

Here, the DTMF sound is used as a means for transmission to outside. The message is output to the DTMF sound generating portion 10, in which the message is converted to the DTMF sound. Then, the DTMF sound is transmitted from the DTMF sound output portion 11, preferably to a speaker of a telephone.

On the other hand, the message receiving person is preliminarily notified of the code number attached to the message. Or the code number is preliminarily determined between the message transmitting person and message receiving person.

A method for registration of the code number in the radio data transmission apparatus by the message receiving person will be described with reference to FIG. 5.

First, the code number is input through the input portion 7 (S21). The input code number is transmitted to the scramble generating portion 5 so that it is scrambled (S22). The scramble method for use here is the same between the transmitting person and receiving person. A scrambled code number is stored in the code number storage portion 4 (S23) and then the registration of the code number is completed. A receiving person intending to receive the scramble messages from a plurality of transmitting persons register other message code numbers in the same procedure.

Next, the reception action will be described with reference to FIG. 6.

A message transmitted from a transmitting person is captured by the receiving antenna 1 for receiving a transmission radio wave (S1). The message is processed by the receiving portion 2 as a reception signal from the antenna and stored in the reception data storage portion 14. At this time, the receiving person is notified by the sound dispatching portion 8 that a message has arrived. The received message type includes a scrambled message and a not scrambled normal message. That is, they are a scrambled message provided with a code number and a message which cannot be scrambled because no code number is attached.

After the message arrives, the message is reproduced. The received message stored in the reception data storage portion 14 is compared with a scrambled code number preliminarily registered in the code number storage portion 4 at the comparing portion 12 (S2). If a message to be reproduced is a scrambled message, it is possible to determine whether that message is a scrambled message having a registered code number or other message, because the scrambled code number is attached to the head of the message upon transmission (S3). If the scrambled code number does not coincide (S3, No), that message is displayed at the display portion 9 as it is (S4). The message to be displayed here includes a message (a message not for itself) having a not registered scrambled code number and a normal message. The message having a not registered scrambled code number cannot be read about its content because of the scramble, so that secrecy of a message intended for other people is secured. The normal message not requiring secrecy can be read without any treatment.

If the scrambled code number coincides (S3, Yes), the scrambled message is sent to the unscrambling portion 6, in which the message is unscrambled (S5).

Next, to display this unscrambled message, the code number is verified again. The radio data transmission apparatus turns in a code number input waiting condition and the message receiving person inputs a code number notified from the transmitting person through the input portion 7 (S6). Because the scramble is released here, the input code number is compared with a code number attached to the head of a message (S7). If the numbers do not coincide with each other as a result of the comparison (S8, No), it is indicated at the display portion 9 that the code numbers are different. If the numbers coincide with each other (S8, Yes), the message portion excluding the code number is displayed at the display portion 9 (S10).

As for the code number input waiting condition, preferably, code number input waiting condition is indicated on the display portion 9. By this display, a carrier of this apparatus can see that the received message has a specific code number and distinguish it from a tone only reception having no message. That is, because the received message is not displayed on the display portion 9, it is preferable that the carrier is capable of distinguishing a reception with a message or tone only reception.

If the received scrambled code number coincides with a scrambled code number stored (S3, Yes), the received scrambled message may be displayed like the case of No. In this case, because control action for the display portion in processing S3 is not distinguished, the control action for the display portion can be simplified. Then, it is preferable to display an indication urging to input a code number if the scrambled code numbers coincide with each other.

Although in the above described embodiment, all received signals are all processed, it is permissible to selectively receive signals like ordinary pager system. That is, it is permissible to so construct that a call number inherent of a particular receiving apparatus is input at the transmission side and only a receiving apparatus having the specified call number receives its message and carries out the aforementioned processing.

Thus, the above radio data transmission apparatus contains at least a selective call receiver.

Although in the above-mentioned embodiment, the apparatus contains transmission and receiving functions, the present invention is not restricted to this example, but can be applied to a receiving apparatus like the pager. In this case, the transmission side only have to contain a code number and message input means, a scramble generating means and a transmission means.

Further, although a scrambled code number is stored in the storage portion, an unscrambled input code number may be also stored. In this case, the received scrambled code number is compared with an unscrambled and then stored code number. However, in this case, if a not registered code number applies a type of scramble system as the scramble method, that number is displayed in the scramble condition but its content is deciphered. Thus, in a case when a received and deciphered message is stored in the storage portion, a received message can be read from the storage portion using a deciphering device or the like.

Next, other preferred embodiment of the present invention will be described with reference to FIGS. 8, 9.

Figure 8:
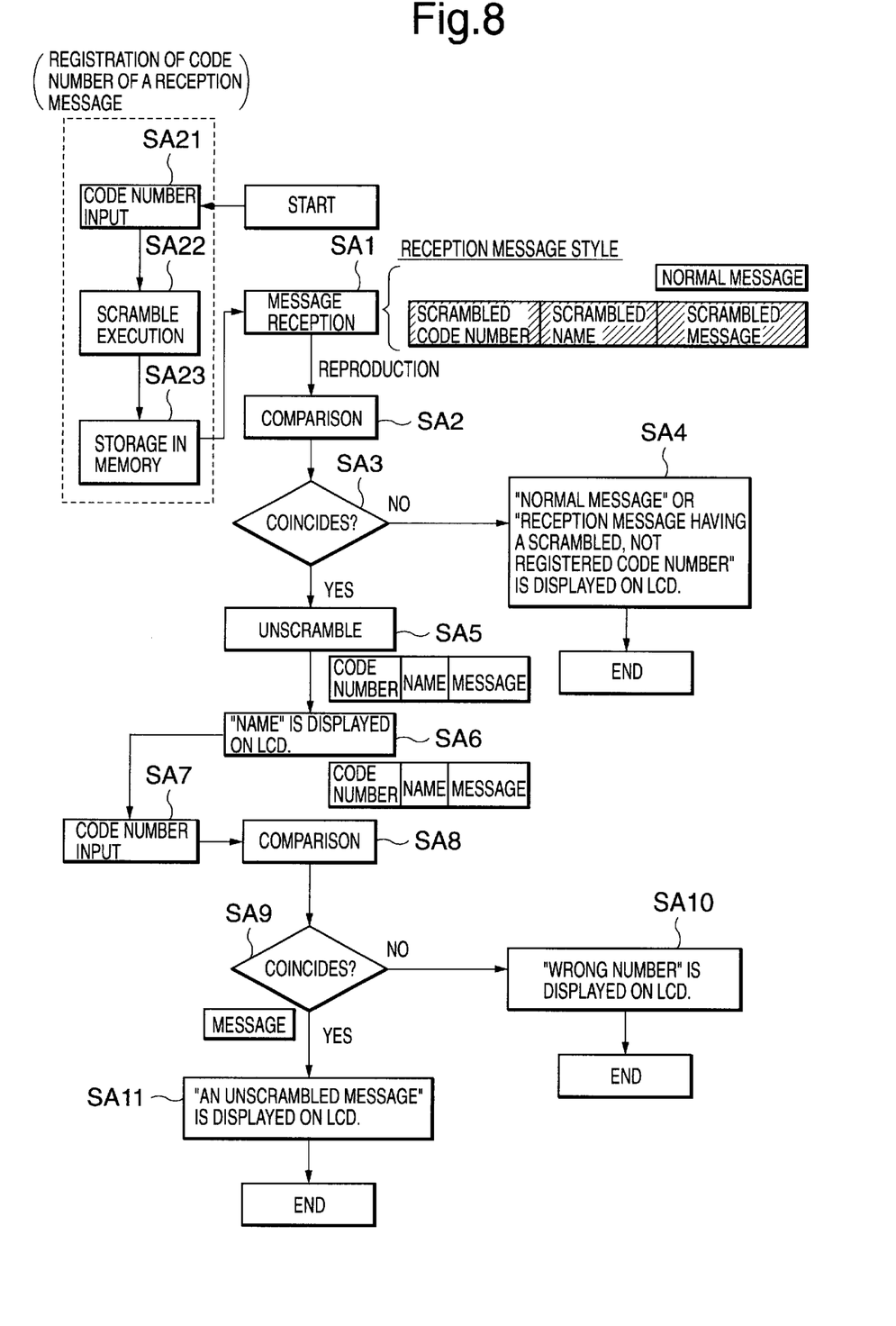
FIG. 8 is a flow chart for explaining an operation of a second embodiment of the radio data transmission apparatus of the present invention.
Figure 9:
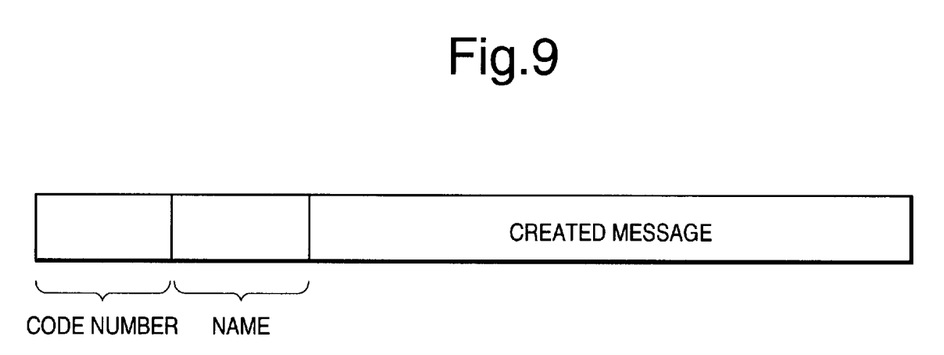
FIG. 9 is a structure diagram showing a message structure of the second embodiment of scramble message.

FIG. 8 is a flow chart for explaining an operation of a second embodiment of the present invention. FIG. 9 shows an example of message structure of a transmission message for use therein. The configuration of the radio data transmission apparatus is the same as FIG. 3.

At the time of message creation, the message transmitting person creates a message through the input portion 7 in the same procedure as the first embodiment. FIG. 9 shows the message structure at this time. What is different from the first embodiment is that a transmitting person name information is added between the code number and message in transmission message data. The message creating person inputs a message creating person's name of a specified character number (e.g., four characters) after the code number is input. That is, in the transmission message, "code number", "name" and "created message" are stored in this order. After the message creation is finished, a message transmission instruction is input through the input portion 7, so that the created message with the code number and name is input to the scramble generating portion 5. Then, the entire created message is scrambled and output to outside.

Like the first embodiment, the message receiving side preliminarily scrambles a correspondent's code number (SA21, SA22) and stored the scrambled code number in the code number storage portion 4 (SA23). When the above message with the code number and name is received (SA1) and reproduced, the code numbers are compared (SA2). If the code number of a received message coincides with a code number registered in the code number storage portion 4 (SA3, Yes), the scramble applied to the message is released by the unscrambling portion 6 (SA5). After that, "name" data attached to the message is displayed on the display portion 9 (SA6). The message receiving person judges a code number attached to the received message according to the name and inputs it through the input portion 7 (SA7).

Because a subsequent operation is the same as the first embodiment, a description thereof is omitted to avoid redundancy.

Next, further other embodiment of the present invention will be described with reference to FIG. 10.

Figure 10:
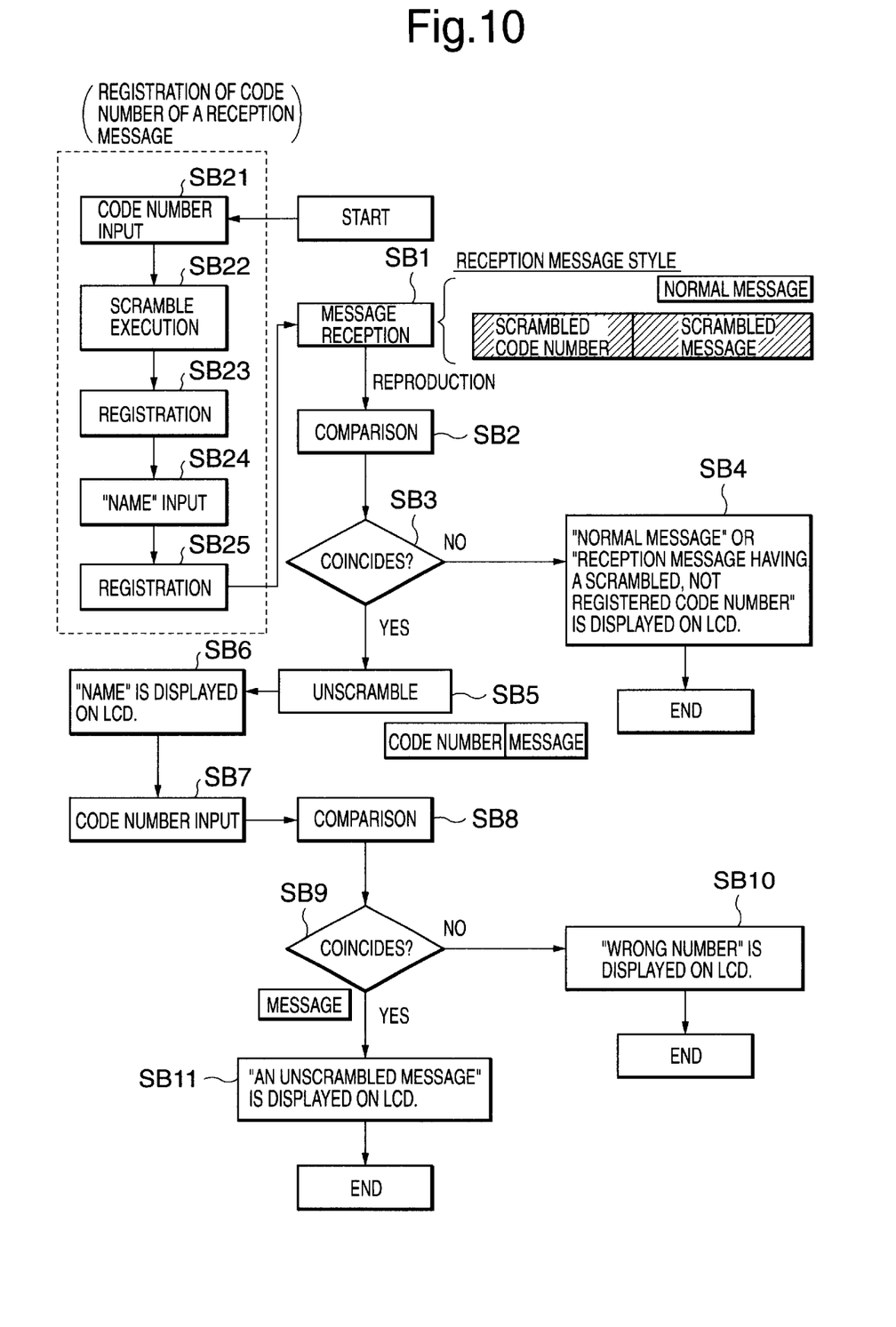
FIG. 10 is a flow chart for explaining an operation of a third embodiment of the radio data transmission apparatus of the present invention.

FIG. 10 is a flow chart for explaining an operation of a third embodiment of the radio data transmission apparatus. A message structure of the transmission message is the same as the first embodiment and indicated in FIG. 6. The structure of a radio data transmission apparatus is the same as FIG. 3.

According to the third embodiment, the name information for displaying the name after the scrambled message is unscrambled is not attached by a message creating person through a procedure of applying the name information to the message but a receiving person registers a scrambled code number in the code number storage portion 4 of the radio data transmission apparatus (SB21–SB23) and further inputs a code number owner' name as the name information (SB24), so that it is stored in the code number storage portion 4 (SB25). As a result, after the scrambled code numbers coincide with each other (SB3, Yes), a name of the owner of the code number coinciding in the comparison (SB2) is displayed (SB6). Because the other operation is the same as the second embodiment, a description thereof is omitted to avoid redundancy.

As described above, according to the present invention, the message transmitting person scrambles the transmission message and attaches a code number for releasing the scramble to the transmission message. As a result, if the message is sent by mistake to an unexpected person because of telephone number error, there is no fear that that message is read by him. Further, if the message is received by a target receiver, only a person knowing its code number can read the scrambled message by inputting that code number to display the message. Thus, it is possible to prevent the message from being read without permission and secure confidential transmission for a proper message receiving person thereby privacy protection being achieved.

The reason is that because the transmitting person attaches a code number to a message freely, only a person notified of that code number can display the message.

Further, according to the present invention, whether or not the message should be scrambled is determined depending on a judgment of the message transmitting person. If it is determined that no secrecy is needed, normal message can be sent at any time and a particular message style is not specified The reason is as follows. At the comparing portion for the code number, the message is displayed as it is if the code numbers do not coincide. The code number attached to the message does not limit only reproduction of the message but also aims at unscrambling the message. Even if a message is displayed when the code numbers do not coincide, a content of the scrambled message cannot be understood. However, for this reason, the normal message which necessarily induces an incoincidence as a result of the comparison because no code number is attached, can be handled in the same way as the scrambled message.

While the invention has been described with reference to specific embodiments thereof, it will be appreciated by those skilled in the art that numerous variations, modifications, and embodiments are possible, and accordingly, all such variations, modifications and embodiments are to be regarded as being with in the spirit and scope of the invention.

What is claimed is:

1. A radio data transmission apparatus comprising:
    a receiving means for receiving a radio signal containing a scrambled code number, header portion and message;
    an input means;
    a scrambled generating means for scrambling a code number input from said input means;
    a comparing means for performing: a first comparison, comparing the received scrambled code number with a stored code number; and a second comparison, comparing a scrambled input code number scrambled by said scramble generating means with a scramble code number received by said receiving means; and
    an unscrambling means for unscrambling the scrambled message received by said receiving means and generating a reception message when said comparing means determines that said scrambled input code number coincides with the received scrambled code number.

2. A radio data transmission apparatus according to claim 1 further comprising a display means for displaying the reception message sent from said unscrambling means.

3. A radio data transmission apparatus of claim 1, further comprising:
    a receiving means for receiving a radio signal containing a scrambled code number and message;
    a storage means for storing said scrambled input code number scrambled by said scramble generating means.

4. A radio data transmission apparatus according to claim 3 which stands by for an input of the code number from said input means when said name is displayed on said display portion.

5. A radio data transmission apparatus according to claim 3 further comprising a display means for displaying the reception message sent from said unscrambling means.

6. A radio data transmission apparatus according to claim 5 wherein said display means displays said received scrambled message when said comparing means determines that said scrambled code number does not coincide with said scrambled input code number.

7. A radio data transmission apparatus according to claim 5 in which an input of a code number through said input means is urged to display a received message when said comparing means determines that said scrambled code number coincides with said scrambled input code number, said comparing means compares a code number from said input means with a received code number and said received message is displayed on said display portion when the input code number coincides with the received code number.

8. A radio data transmission apparatus according to claim 3 further comprising a transmitting means for transmitting an output signal from said scramble generating means after a message and code number input through said input means are scrambled by said scramble generating means.

9. A control method for a radio data transmission apparatus comprising the steps of:
    receiving a radio signal containing a scrambled code number, header portion and message;
    comparing the received scrambled code number with a predefined code number;
    scrambling a code number input from an input means;
    comparing a scrambled input code number with a received scrambled code number; and
    unscrambling said received scrambled header portion and message, and generating a reception message when the received scrambled input code number does not coincide with said received scrambled code number at said comparing step.

* * * * *